(12) United States Patent
Kondo et al.

(10) Patent No.: US 12,116,971 B2
(45) Date of Patent: Oct. 15, 2024

(54) POWER GENERATION SYSTEM

(71) Applicant: TATSUMI RYOKI CO., LTD, Tokyo (JP)

(72) Inventors: Toyoshi Kondo, Tokyo (JP); Nobuhide Hamano, Tokyo (JP)

(73) Assignee: TATSUMI RYOKI CO., LTD, Tokyo (JP)

( * ) Notice: Subject to any disclaimer, the term of this patent is extended or adjusted under 35 U.S.C. 154(b) by 246 days.

(21) Appl. No.: 17/784,041

(22) PCT Filed: Mar. 22, 2021

(86) PCT No.: PCT/JP2021/011610
§ 371 (c)(1),
(2) Date: Oct. 17, 2022

(87) PCT Pub. No.: WO2021/205853
PCT Pub. Date: Oct. 14, 2021

(65) Prior Publication Data
US 2023/0139764 A1  May 4, 2023

(30) Foreign Application Priority Data
Apr. 7, 2020 (JP) ................. 2020-068732

(51) Int. Cl.
*F03B 13/14* (2006.01)
*B63B 35/44* (2006.01)
*F03D 13/25* (2016.01)

(52) U.S. Cl.
CPC .............. *F03B 13/14* (2013.01); *B63B 35/44* (2013.01); *F03D 13/25* (2016.05); *B63B 2035/4466* (2013.01)

(58) Field of Classification Search
CPC ... B63B 2035/4473; B63B 35/44; C25B 1/04; F03B 13/12; F03B 13/14
(Continued)

(56) References Cited

U.S. PATENT DOCUMENTS 9,764,804 B1    9/2017  Kennamer, Sr.
2009/0020418 A1  1/2009  Sugai et al.

FOREIGN PATENT DOCUMENTS

CN    203978703 U    12/2014
CN    207297290 U     5/2018
(Continued)

OTHER PUBLICATIONS

International Search Report issued in PCT/JP2021/011610 mailed on May 25, 2021 with English Translation (9 pages).
(Continued)

*Primary Examiner* — Burton S Mullins
(74) *Attorney, Agent, or Firm* — Nakanishi IP Associates, LLC

(57) ABSTRACT

Provided is a power generation system including a wave power generator that can be configured in a simple manner. The power generation system 1 includes: a power generation unit including a wave power generator 11; a power storage unit 40 accumulating electric power obtained by the power generation unit; a production unit 51 producing at least one of hydrogen and an organic hydride based on the electric power obtained by the power storage unit; and a tank 53 located below compared to the wave power generator 11 and storing at least one of the hydrogen and the organic hydride obtained by the production unit 51.

8 Claims, 8 Drawing Sheets

(58) Field of Classification Search
USPC ............................................. 290/55; 60/497
See application file for complete search history.

(56) References Cited

FOREIGN PATENT DOCUMENTS

| | | | |
|---|---|---|---|
| CN | 110486216 A | 11/2019 | |
| CN | 110945234 A | 3/2020 | |
| JP | S58-64867 U | 5/1983 | |
| JP | S58-104366 U | 7/1983 | |
| JP | H3-1452 A | 1/1991 | |
| JP | 04156241 * | 5/1992 | ............ Y02E 60/36 |
| JP | H8-261131 A | 10/1996 | |
| JP | 2005-145218 A | 6/2005 | |
| JP | 2005-247764 A | 9/2005 | |
| JP | 2006-46152 A | 2/2006 | |
| JP | 2015-187437 A | 10/2015 | |
| JP | 2016-039130 A | 3/2016 | |
| JP | 2018004020 * | 1/2018 | ............ Y02E 60/32 |
| JP | 2018-40301 A | 3/2018 | |
| WO | 2006/077999 A1 | 7/2006 | |
| WO | 2006/120841 A1 | 11/2006 | |

OTHER PUBLICATIONS

Written Opinion of International Searching Authority issued in 2021/011610 mailed on May 25, 2021 with English Translation (10 pages).
Office Action issued in Taiwanese Patent Application No. 110110507 dated Aug. 15, 2024, with English Translation (11 pages).

* cited by examiner

POWER GENERATION SYSTEM

TECHNICAL FIELD

The present invention relates to a power generation system.

BACKGROUND ART

Conventionally, a power generation system including a wave power generator has been proposed as in Patent Literature 1.

CITATION LIST

Patent Literature

Patent Literature 1: JP 2016-039130 A

SUMMARY OF INVENTION

Technical Problem

However, it is necessary to install a member for a power generator or the like not to flow, such as an anchor.

Therefore, an object of the present invention is to provide a power generation system including a wave power generator that can be configured in a simple manner.

Solution to Problem

A power generation system according to the present invention includes: a power generation unit including a wave power generator; a power storage unit accumulating electric power obtained by the power generation unit; a production unit producing at least one of hydrogen and an organic hydride based on the electric power obtained by the power generation unit; and a tank located below compared to the wave power generator and storing at least one of the hydrogen and the organic hydride obtained by the production unit.

A power generation system according to the present invention includes: a power generation unit including a wave power generator; a power storage unit accumulating electric power obtained by the power generation unit; a production unit producing at least one of hydrogen and an organic hydride based on the electric power obtained by the power generation unit; and a tank located below compared to the production unit and under water, and storing at least one of the hydrogen and the organic hydride obtained by the production unit.

Some of the electric power obtained by the power generation unit such as the wave power generator is accumulated in the power storage unit, and the other of the electric power is used for hydrogenation or the like and accumulated as hydrogen or an organic hydride in the tank.

The tank can be used as a sinker of the power generation system.

By using the tank located under the water, it is possible to configure the power generation system including the wave power generator in a simple manner.

Preferably, the production unit is a hydrogenation unit producing the organic hydride from an aromatic compound.

The tank includes a first tank storing the aromatic compound and a second tank storing the organic hydride.

Some of the electric power obtained by the power generation unit such as the wave power generator is accumulated in the power storage unit, and the other of the electric power is used for hydrogenation and accumulated as an organic hydride containing hydrogen in the tank (the second tank).

The organic hydride accumulated in the second tank can be easily transported by a ship or the like as compared with a mode in which hydrogen is transported in a gaseous or liquid state, and hydrogen can be easily extracted and used at a place spaced away from a power generation system 1.

The aromatic compound accumulated in the first tank and the organic hydride accumulated in the second tank can be used as a sinker of the power generation system.

By using the tank located under the water, it is possible to configure the power generation system 1 including the wave power generator in a simple manner.

More preferably, the wave power generator includes a float, a first movement member moving in a vertical direction in conjunction with a vertical movement of the float, a second movement member engaged with the first movement member to rotate based on a vertical movement of the first movement member, and a power generation device generating power based on a rotational force of the second movement member.

The power generation device can be disposed at a position where the waterproof treatment is easily performed, for example, on a base part.

More preferably, the power generation unit includes a wind power generator.

A rotational force of an impeller of the wind power generator and the rotational force of the second movement member are transmitted to the power generation device via a power transmission unit.

The power generation device can be shared by the wave power generator and the wind power generator.

Preferably, the power generation system further includes a base part located above compared to a float of the wave power generator and holding the power storage unit.

At least a part of the wave power generator passes through a tubular member or a bar-shaped member connecting the base part and the tank, and is held in a swingable state in the vertical direction.

The wave power generator can be held by utilizing the tubular member connecting the base part and the tank to each other.

More preferably, the tank has a donut shape.

The tubular member or the bar-shaped member extends from an outer wall on an inward side of the donut-shaped tank.

The aromatic compound passes through the inside of at least one of the tubular members.

The organic hydride passes through the inside of at least one of the tubular members other than the tubular member through which the aromatic compound passes inside.

Since the tank is formed in the donut side shape, it is less likely to break due to pressure from the outside, and it is less likely to fall down even though the base part or the like is disposed thereon.

A worker can enter the gap to perform maintenance work on the tank, or a mobile monitoring device can circulate along the gap between the tank and the cover to specify a damaged portion of the tank.

Preferably, the tank includes a first partition wall movable inside the tank.

The first partition wall is used to partition the first tank and the second tank.

By using the first partition wall, it is possible to adjust a size of the first tank that accumulates the aromatic compound and a size of the second tank that accumulates the organic hydride.

More preferably, the tank includes a third tank storing water or air.

The third tank is used to adjust a weight of the tank.

By adjusting the filling degree of water in the third tank, it becomes easy to adjust a sinking degree of the tank as a sinker according to the filling degree of the aromatic compound in the first tank 53a and the organic hydride in the second tank.

By filling the third tank with air, the tank can be easily floated.

More preferably, the tank includes a second partition wall movable inside the tank.

The second partition wall is used to partition the second tank and the third tank.

By using the second partition wall, it is possible to adjust a size of the second tank and a size of the third tank.

Preferably, the tank includes a third partition wall movable inside the tank.

The third partition wall is used to partition the third tank and the first tank.

More preferably, the hydrogenation unit produces the organic hydride from the aromatic compound using an organic hydride electrolytic synthesis method.

Preferably, the power generation system further includes a propulsion device provided below the wave power generator and driven based on the electric power from the power storage unit.

The power generation unit includes a wind power generator and a solar power generator.

The wind power generator and the solar power generator are provided on the base part.

A power generation system according to the present invention includes: a power generation unit including a wave power generator; a power storage unit accumulating electric power obtained by the power generation unit; a production unit producing at least one of hydrogen and an organic hydride based on the electric power obtained by the power generation unit; and a tank located below compared to the production unit and under water, and storing at least one of the hydrogen and the organic hydride obtained by the production unit.

Advantageous Effects of Invention

As described above, according to the present invention, it is possible to provide a power generation system including a wave power generator that can be configured in a simple manner.

DESCRIPTION OF EMBODIMENTS

Figure 1:
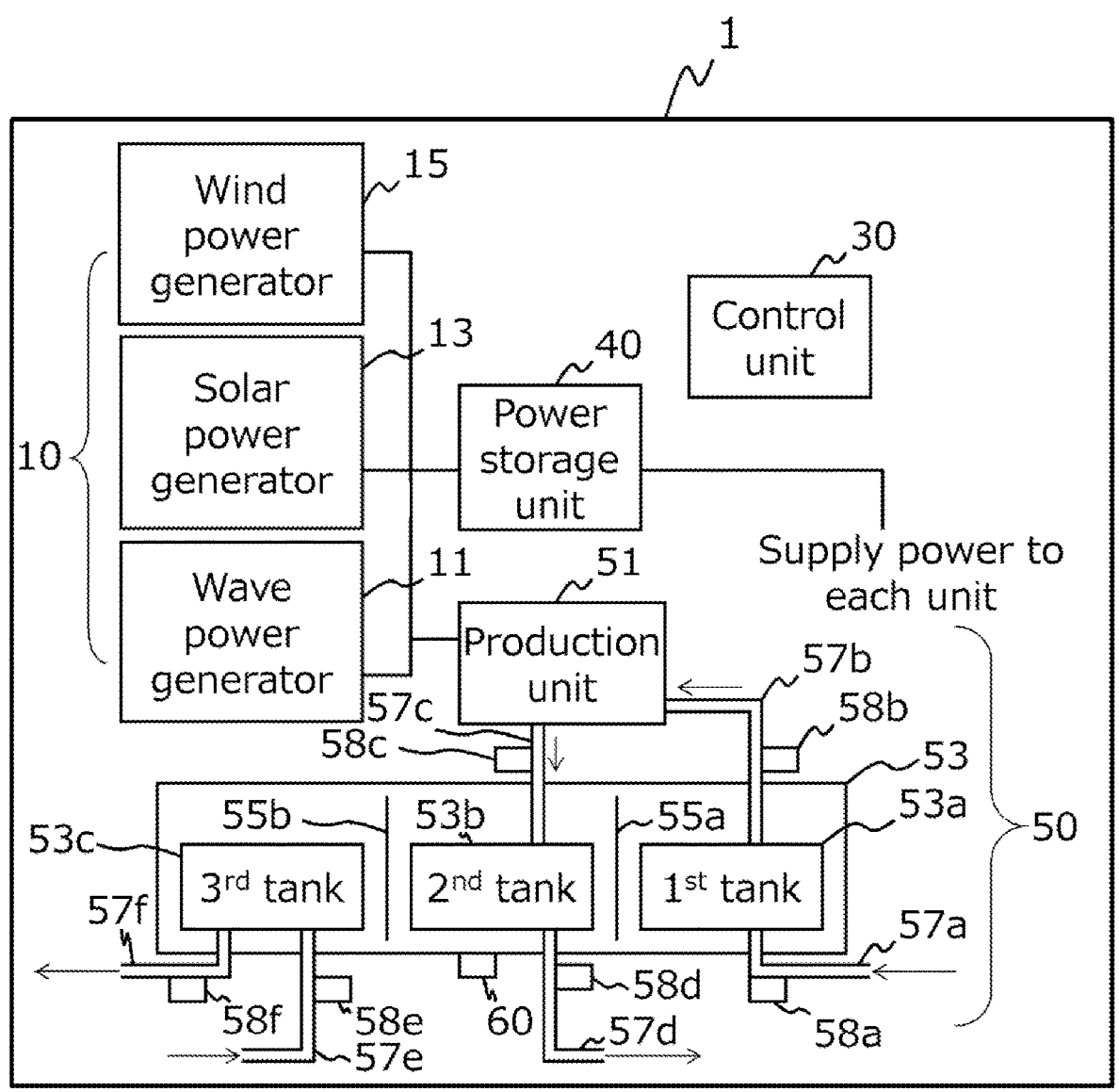
FIG. 1 is a schematic view illustrating a configuration of a power generation system according to a first embodiment.
Figure 2:
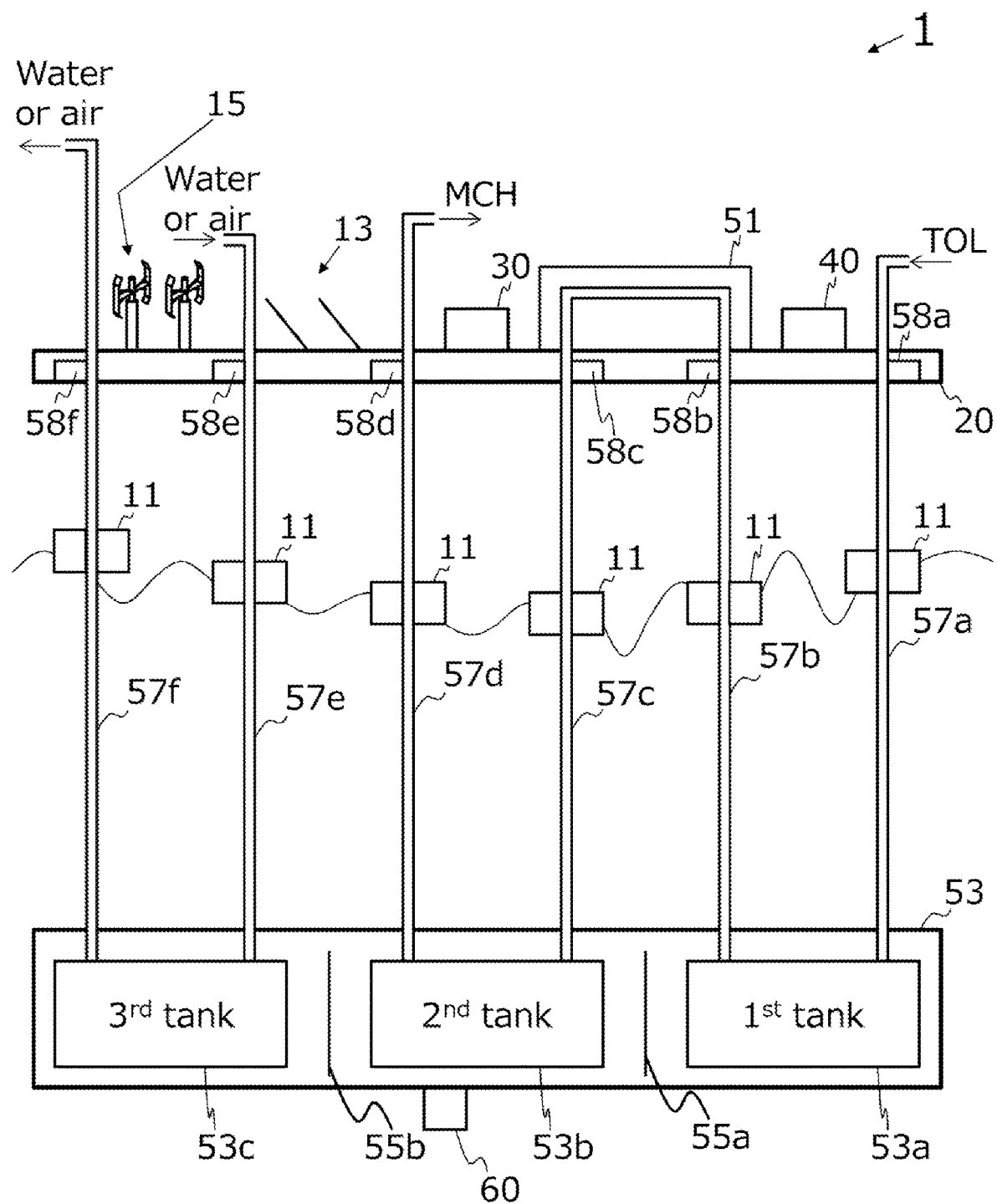
FIG. 2 is a schematic view illustrating a configuration of the power generation system in a height direction.
Figure 3:
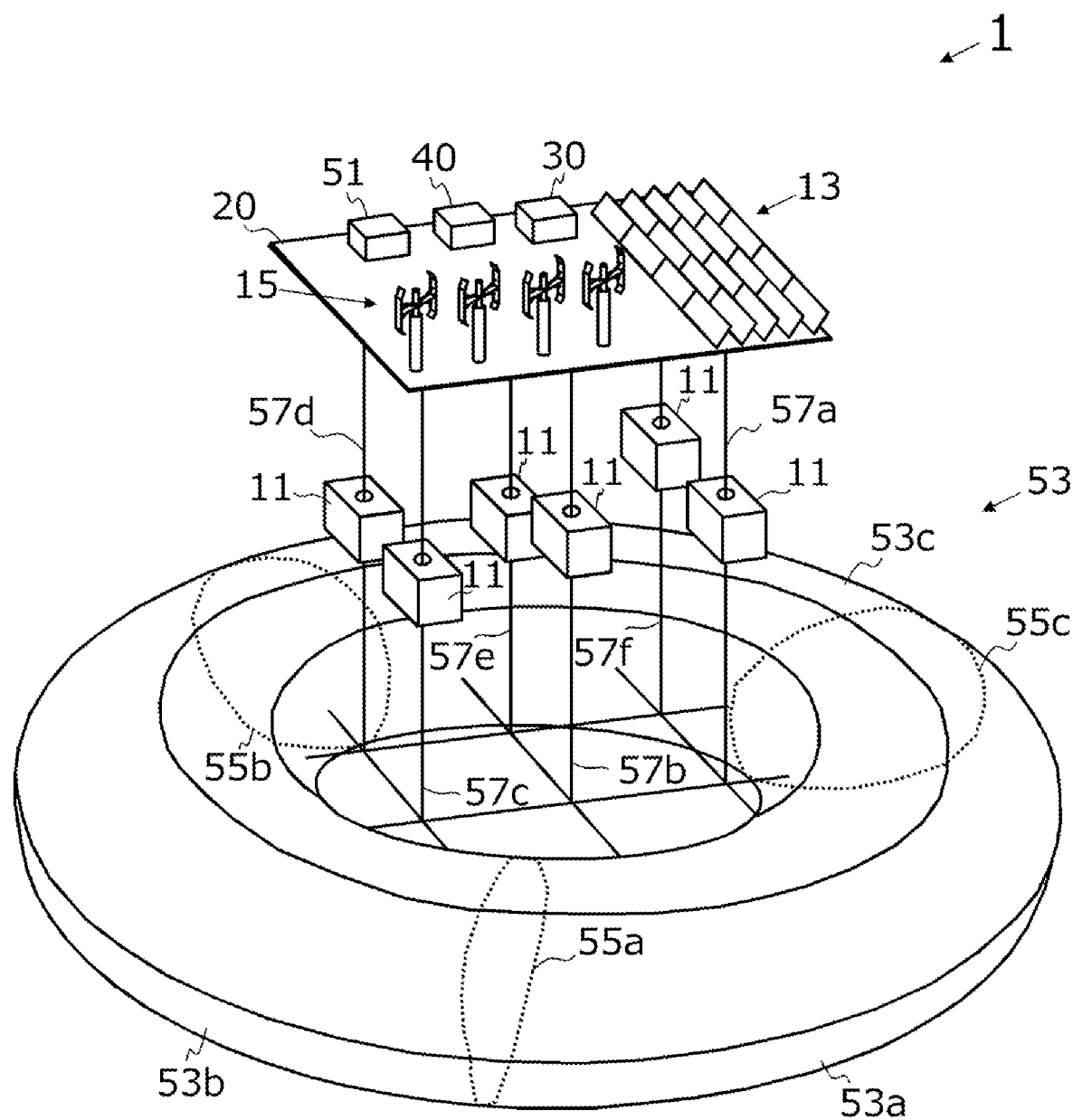
FIG. 3 is a perspective view of the power generation system.

Hereinafter, present embodiments will be described with reference to the drawings.

Note that the embodiments are not limited to the following embodiments. In addition, contents described in one embodiment are similarly applied to another embodiment in principle. Further, the embodiments and modifications thereof can be appropriately combined.

Power Generation System 1

A power generation system 1 according to a first embodiment includes a power generation unit 10, a base part 20, a control unit 30, a power storage unit 40, a hydrogen storage unit 50, and a propulsion device 60 (see FIGS. 1 to 5).

The power generation system 1 is set such that the base part 20 is located above the water, a wave power generator 11 is located on a water surface, and a tank 53 is located under the water.

Power Generation Unit 10

The power generation unit 10 includes a wave power generator 11, a solar power generator 13, and a wind power generator 15.

Wave Power Generator 11

The wave power generator 11 includes a float that swings according to the vertical movement of the wave, and generates electric power based on the vertical movement of said float.

The wave power generator 11 passes through a tubular member of the hydrogen storage unit 50, and is held by said tubular member in a swingable state in a vertical direction.

However, the wave power generator 11 may pass through a bar-shaped member (e.g., a strut) which is other than the tube and which connects the base part 20 and the tank 53 to each other, and may be held by said bar-shaped member in a swingable state in the vertical direction.

In the first embodiment, an example in which the wave power generator 11 is held on the tubular member below the base part 20 will be described.

However, as in a second embodiment to be described later, some (e.g. a female screw part 11c and a power generation device 11d) of the wave power generator 11 may be disposed on the base part 20.

Solar Power Generator 13

The solar power generator 13 generates electric power based on light such as sunlight.

The solar power generator 13 is provided on the base part 20.

Wind Power Generator 15

The wind power generator 15 generates electric power based on a rotational force of an impeller that rotates by wind.

The wind power generator 15 is provided on the base part 20.

AC power generated by the wave power generator 11 and AC power generated by the wind power generator 15 are supplied to the power storage unit 40 or a production unit 51 after being converted into DC power by an AC/DC converter.

Base Part 20

The base part 20 is located on the water, and holds the solar power generator 13, the wind power generator 15, the control unit 30, the power storage unit 40, the production unit 51, and a first pump 58a to a sixth pump 58f.

Control Unit 30

The control unit 30 controls each unit of the power generation system 1.

For example, the control unit controls the driving of the production unit 51 or the like based on a state of charge of the power storage unit 40.

Specifically, the control unit 30 controls each unit of the power generation system 1 so that, when the power storage unit 40 is not sufficiently charged, the electric power obtained by the power generation unit 10 is accumulated in the power storage unit 40, rather than driving the production unit 51.

When the power storage unit 40 is sufficiently charged, that is, when the power storage unit is fully charged, the production unit 51 or the like is driven by the electric power obtained by the power generation unit 10, rather than charging the power storage unit 40.

Power Storage Unit 40

The power storage unit 40 accumulates the electric power obtained by the power generation unit 10 to supply the electric power to electric equipment of the power generation system 1 such as the production unit 51.

Hydrogen Storage Unit 50

The hydrogen storage unit 50 includes the production unit 51, a tank 53, a partition wall, a tubular member, and a pump.

The tank 53 of the hydrogen storage unit 50 includes a first tank 53a, a second tank 53b, and a third tank 53c. The partition wall of the hydrogen storage unit 50 includes a first partition wall 55a, a second partition wall 55b, and a third partition wall 55c.

The tubular member of the hydrogen storage unit 50 includes a first pipe 57a, a second pipe 57b, a third pipe 57c, a fourth pipe 57d, a fifth pipe 57e, and a sixth pipe 57f.

The pump of the hydrogen storage unit 50 includes a first pump 58a, a second pump 58b, a third pump 58c, a fourth pump 58d, a fifth pump 58e, and a sixth pump 58f.

Production Unit 51

The production unit 51 is a first hydrogenation device that produces an organic hydride such as methylcyclohexane from an aromatic compound such as toluene using an organic hydride electrolytic synthesis method.

However, the production unit 51 may include a hydrogen production device that performs electrolysis of water to generate hydrogen, and a second hydrogenation device that adds the generated hydrogen to an aromatic compound to generate an organic hydride.

Tank 53

The tank 53 has a rotating body with its axis of rotation situated on an outer portion of a circle, i.e., a substantially donut shape.

The tank 53 is used to store the organic hydride and the like therein.

The tank 53 is also used as a sinker of the power generation system 1.

The tank 53 is located under the water, and is connected to the base part 20 located on the water via the tubular member and the bar-shaped member.

In the tank 53, three spaces (the first tank 53a, the second tank 53b, and the third tank 53c) are formed by the first partition wall 55a, the second partition wall 55b, and the third partition wall 55c.

The first tank 53a is used to store an aromatic compound in a space formed between the first partition wall 55a and the third partition wall 55c.

The first tank 53a communicates with the first pipe 57a and the second pipe 57b.

The second tank 53b is used to store an organic hydride in a space formed between the first partition wall 55a and the second partition wall 55b.

The second tank 53b communicates with the third pipe 57c and the fourth pipe 57d.

The third tank 53c is used to store water or air in a space formed between the second partition wall 55b and the third partition wall 55c.

The third tank 53c communicates with the fifth pipe 57e and the sixth pipe 57f.

Partition Wall

The first partition wall 55a is movable inside the tank 53, and is used to partition the first tank 53a and the second tank 53b.

A seal member (a first seal member 55a1) such as an O-ring is provided to maintain a sealing state between the first partition wall 55a and an inner wall of the tank 53.

The first partition wall 55a may move by virtue of a pressure difference between the first tank 53a and the second tank 53b, or may move electrically via an actuator.

The second partition wall 55b is movable inside the tank 53, and is used to partition the second tank 53b and the third tank 53c.

A seal member (a second seal member 55b1) such as an O-ring is provided to maintain a sealing state between the second partition wall 55b and the inner wall of the tank 53.

The second partition wall 55b may move by virtue of a pressure difference between the second tank 53b and the third tank 53c, or may move electrically via an actuator.

The third partition wall 55c is fixed inside the tank 53, and is used to partition the third tank 53c and the first tank 53a.

The third partition wall 55c may also be configured to be movable inside the tank 53.

In this case, one of the first partition wall 55a and the second partition wall 55b may be fixed inside the tank 53.

As the first partition wall 55a moves inside the tank 53, the sizes of the first tank 53a and the second tank 53b change.

As the second partition wall 55b moves inside the tank 53, the sizes of the second tank 53b and the third tank 53c change.

Tubular Member

The first pipe 57a has a lower end communicating with an inlet of the first tank 53a and an upper end communicating with a first external device (not illustrated) that supplies an aromatic compound to the first tank 53a.

The second pipe 57b has a lower end communicating with an outlet of the first tank 53a and an upper end communicating with an inlet of the production unit 51.

The third pipe 57c has a lower end communicating with an inlet of the second tank 53b and an upper end communicating with an outlet of the production unit 51.

The fourth pipe 57d has a lower end communicating with an outlet of the second tank 53b and an upper end communicating with a second external device (not illustrated) that receives an organic hydride from the second tank 53b.

The fifth pipe 57e has a lower end communicating with an inlet of the third tank 53c and an upper end being opened.

The sixth pipe 57f has a lower end communicating with an outlet of the third tank 53c and an upper end being opened.

The first and second external devices are installed in a ship, a land facility, or the like.

Pump

The first pump 58a is used to supply the aromatic compound from the first external device to the first tank 53a.

The second pump 58b is used to supply the aromatic compound from the first tank 53a to the production unit 51.

The third pump 58c is used to supply the organic hydride from the production unit 51 to the second tank 53b.

The fourth pump 58d is used to supply the organic hydride from the second tank 53b to the second external device.

The fifth pump 58e is used to supply water or air from the outside to the third tank 53c.

The sixth pump 58f is used to discharge the water or air from the third tank 53c to the outside.

Propulsion Device 60

The propulsion device 60 is constituted by a screw or the like, and is provided in an area located below compared to the wave power generator 11 and under the water (under the sea), for example, under the tank 53.

The propulsion device 60 is driven on the basis of the electric power supplied from the power storage unit 40, and is used to move the power generation system 1 and maintain the power generation system 1 at a predetermined position.

Operation

Next, an operation of the pumps of the power generation system 1 will be described.

At the time of starting an operation, the control unit 30 operates the first pump 58a to supply an aromatic compound from the first external device to the first tank 53a. Accordingly, the first tank 53a becomes in a large-size state (see FIG. 4).

The second tank 53b is in a small-size state because an organic hydride has not been produced yet.

The control unit 30 operates the fifth pump 58e to supply water from the outside to the third tank 53c.

Due to the weight of the aromatic compound in the first tank 53a and the weight of the water in the third tank 53c, the tank 53 becomes in a sunk state under the water.

Electric power is generated by the wave power generator 11, the solar power generator 13, and the wind power generator 15 of the power generation unit 10, and the generated electric power is accumulated in the power storage unit 40.

When the power storage unit 40 is fully charged, the control unit 30 stops supplying electric power from the power generation unit 10 to the power storage unit 40, and starts supplying electric power from the power generation unit 10 to the production unit 51.

Here, the full charge is not limited to a 100% charged state, and may refer to a predetermined charged state in the range of about 80 to 90%.

In addition, the control unit 30 operates the second pump 58b to supply the aromatic compound from the first tank 53a to the production unit 51.

The production unit 51 produces an organic hydride from the aromatic compound.

The control unit 30 operates the third pump 58c to supply the organic hydride produced by production unit 51 to the second tank 53b.

Then, the amount of the organic hydride in the second tank 53b increases while the amount of the aromatic compound in the first tank 53a decreases. Accordingly, the first partition wall 55a moves so that the size of the second tank 53b increases while the size of the first tank 53a decreases (see FIG. 5).

The control unit 30 adjusts an amount of the water in the third tank 53c in order to adjust a sinking degree of the tank 53, for example, in order to maintain a constant waterline.

When the sinking degree of the tank 53 is shallow, the control unit 30 operates the fifth pump 58e to supply water from the outside to the third tank 53c.

In this case, the second partition wall 55b moves so that the size of the third tank 53c increases.

When the sinking degree of the tank 53 is deep, the control unit 30 operates the sixth pump 58f to discharge the water in the third tank 53c to the outside.

Figure 4:
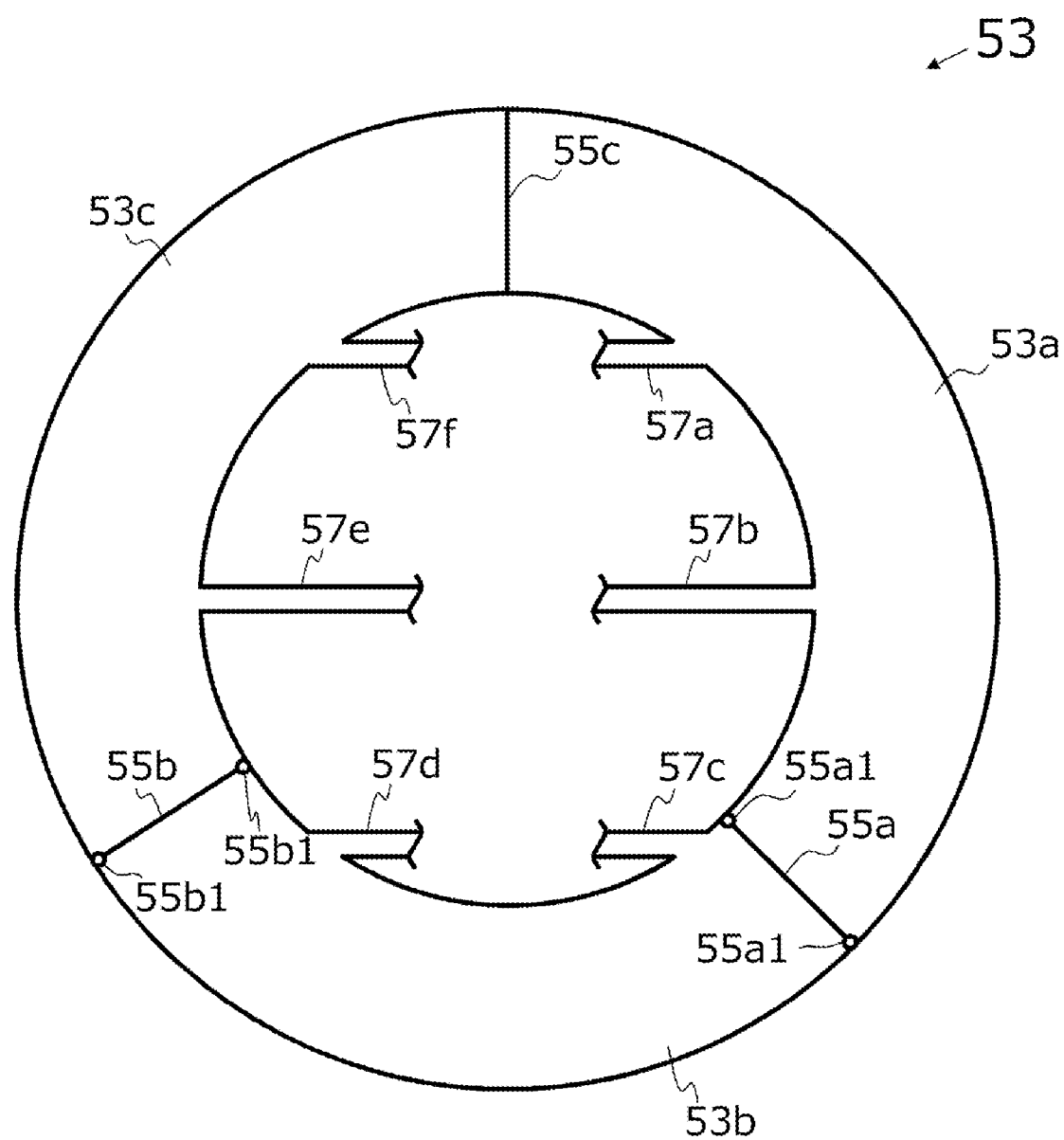
FIG. 4 is a cross-sectional view illustrating a configuration of a tank in a state where a size of a first tank becomes large.
Figure 5:
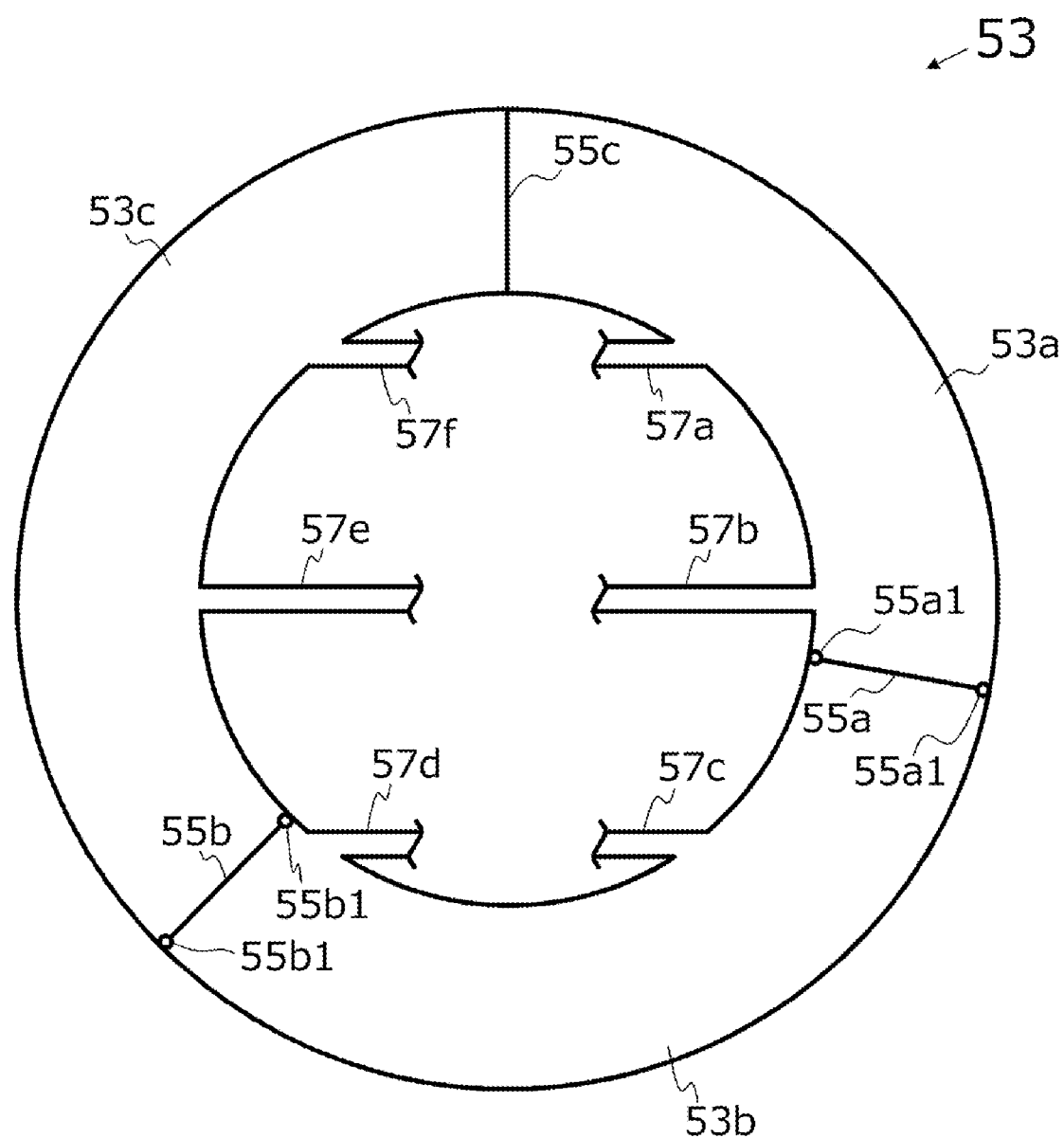
FIG. 5 is a cross-sectional view illustrating a configuration of a tank in a state where a size of a second tank and a size of a third tank become large.

In this case, the second partition wall 55b moves so that the size of the third tank 53c decreases (see FIG. 4).

In order for the tank 53 to rise up on the water for the purpose of performing the maintenance of the tank 53 or the like, the control unit 30 operates the sixth pump 58f to discharge the water in the third tank 53c to the outside and operates the fifth pump 58e to supply air from the outside to the third tank 53c.

In this case, due to the buoyancy of the tank 53, the tank 53 rises up to be close to the water surface.

Effect of Accumulating Electric Power and Organic Hydride

In the first embodiment, some of the electric power obtained by the power generation unit 10 such as the wave power generator 11 is accumulated in the power storage unit 40, and the other of the electric power is used for hydrogenation and accumulated as an organic hydride containing hydrogen in the tank 53 (the second tank 53b).

The electric power accumulated in power storage unit 40 is used to drive electric equipment of the power generation system 1 and drive external electric equipment.

In addition, the power storage unit 40 may be detached in a state where electric power is accumulated therein and used to drive external electric equipment.

The organic hydride accumulated in the second tank 53b can be easily transported by a ship or the like as compared with a mode in which hydrogen is transported in a gaseous or liquid state, and hydrogen can be easily extracted and used at a place spaced away from the power generation system 1.

The aromatic compound accumulated in the first tank 53a and the organic hydride accumulated in the second tank 53b can be used as a sinker of the power generation system 1.

By using the tank 53 located under the water, it is possible to configure the power generation system 1 including the wave power generator 11 in a simple manner.

Effect of Holding Wave Power Generator Using Pipe of Hydrogen Storage Unit 50

At least a part (a float or the like) of the wave power generator 11 passes through a pipe of the hydrogen storage unit 50 such as the first pipe 57a in a swingable state in the vertical direction, and is held by said pipe.

Therefore, the wave power generator 11 can be held by utilizing a tubular member or the like connecting the base part 20 and the tank 53 to each other.

Effect of Forming Tank in Doughnut Shape

Since the tank 53 is formed in a donut side shape, it is less likely to break due to pressure from the outside, and it is less likely to fall down even though the base part 20 or the like is disposed thereon.

Effect of Providing First Partition Wall

By using the first partition wall 55a, it is possible to adjust a size of the first tank 53a that accumulates the aromatic compound and a size of the second tank 53b that accumulates the organic hydride according to the degree of filling.

Effect of Providing Third Tank 53c

By adjusting the filling degree of water in the third tank 53c, it becomes easy to adjust a sinking degree of the tank 53 as a sinker according to the filling degree of the aromatic compound in the first tank 53a and the organic hydride in the second tank 53b.

By filling the third tank 53c with air, the tank 53 can be easily floated.

Effect of Providing Second Partition Wall

In addition, by using the second partition wall 55b, it is possible to adjust a size of the second tank 53b and a size of the third tank 53c that accumulates water or air.

Mode in which Hydrogen is Stored

Note that, as an example of the first embodiment, it has been described that some of electric power obtained by the power generation unit 10 is stored in the tank 53 as an organic hydride containing hydrogen.

However, the substance stored in the tank 53 is not limited to the organic hydride as long as the tank 53 is disposed below compared to at least one of the wave power generator 11 and the production unit 51 for use as a sinker under the water. For example, hydrogen obtained by electrolyzing water may be stored in a gaseous or liquid state in the tank 53.

In this case, the production unit 51 functions as a hydrogen production device electrolyzing water to produce hydrogen.

Effect of Accumulating Electric Power and Hydrogen

In the first embodiment, some of the electric power obtained by the power generation unit 10 such as the wave power generator 11 is accumulated in the power storage unit 40, and the other of the electric power is used to produce hydrogen and the hydrogen is accumulated in the tank 53.

The electric power accumulated in power storage unit 40 is used to drive electric equipment of the power generation system 1 and drive external electric equipment.

In addition, the power storage unit 40 may be detached in a state where electric power is accumulated therein and used to drive external electric equipment.

Also, the tank 53 can be used as a sinker of the power generation system 1.

By using the tank 53 located under the water, it is possible to configure the power generation system 1 including the wave power generator 11 in a simple manner.

Specific Example of Wave Power Generator 11

As an example of the first embodiment, it has been described that the float and the power generation device of the wave power generator 11 are housed in one case and are located below compared to the base part 20.

Specifically, a mode is conceivable that the vertical movement of the float may cause a change of an air chamber in volume, and electric power may be generated by a rotation of a turbine based on said change of the air chamber in volume.

Alternatively, a mode is conceivable that the vertical movement of the float may cause a rotation of a pinion of the power generation device engaged with a rack of the tubular member, and electric power may be generated based on said rotation of the pinion.

Alternatively, a mode is conceivable that the vertical movement of the float may cause a rotation of a screw about an axis parallel to the vertical direction in which the tubular member extends, while the screw moves in the vertical direction to be located on the water above the float or located under the water below the float, and electric power may be generated based on said rotation of the screw.

Note that said screw is not limited to rotating about the axis parallel to the vertical direction, and may rotate about an axis parallel to a horizontal direction. In this case, said screw rotates according to the flow of the tide in the transverse direction. Like the propulsion device 60, said screw may also be located under the tank 53.

Figure 6:
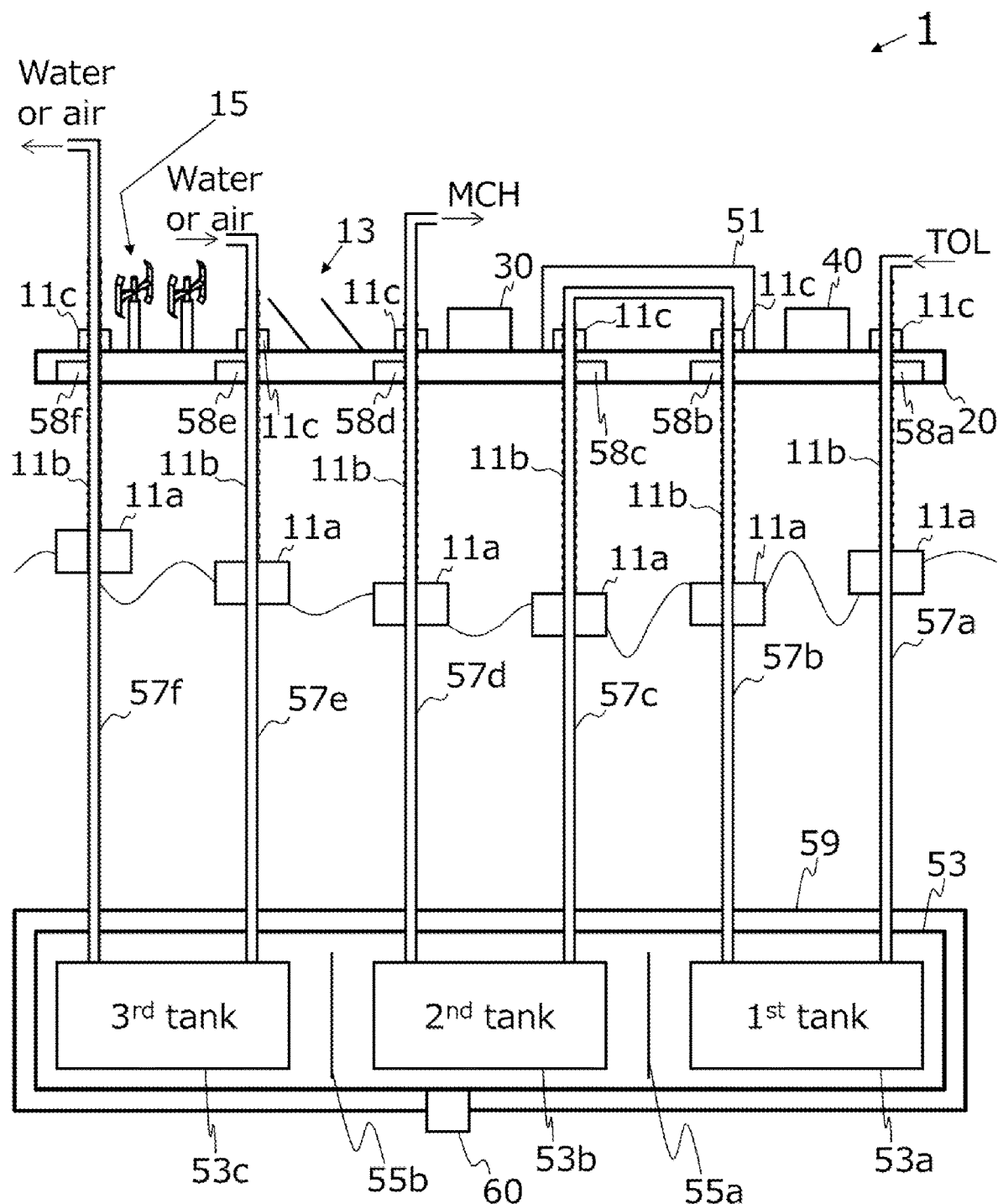
FIG. 6 is a schematic view illustrating a configuration of a power generation system in a height direction according to a second embodiment.
Figure 7:
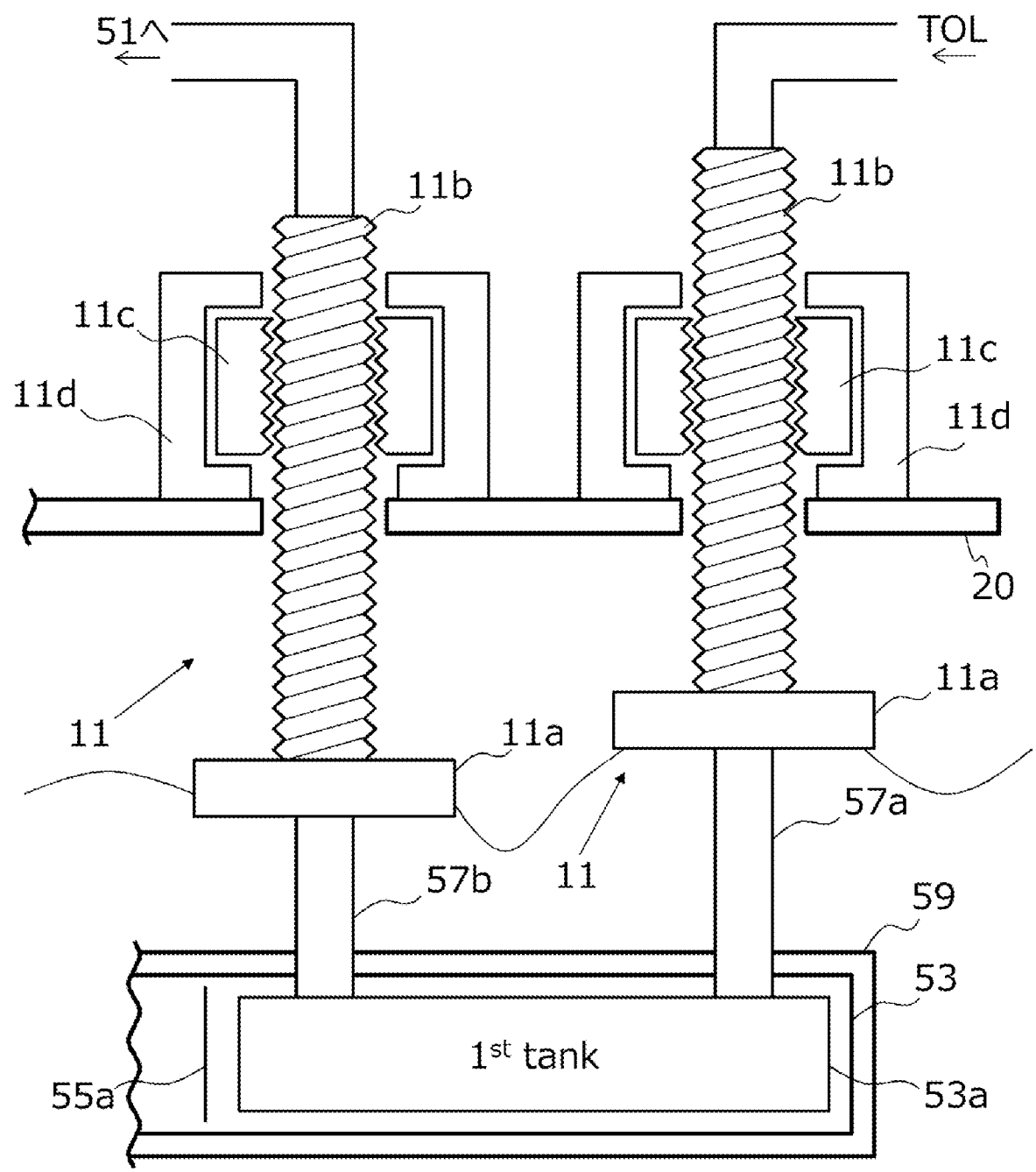
FIG. 7 is a schematic view illustrating an internal structure of a wave power generator according to the second embodiment.
Figure 8:
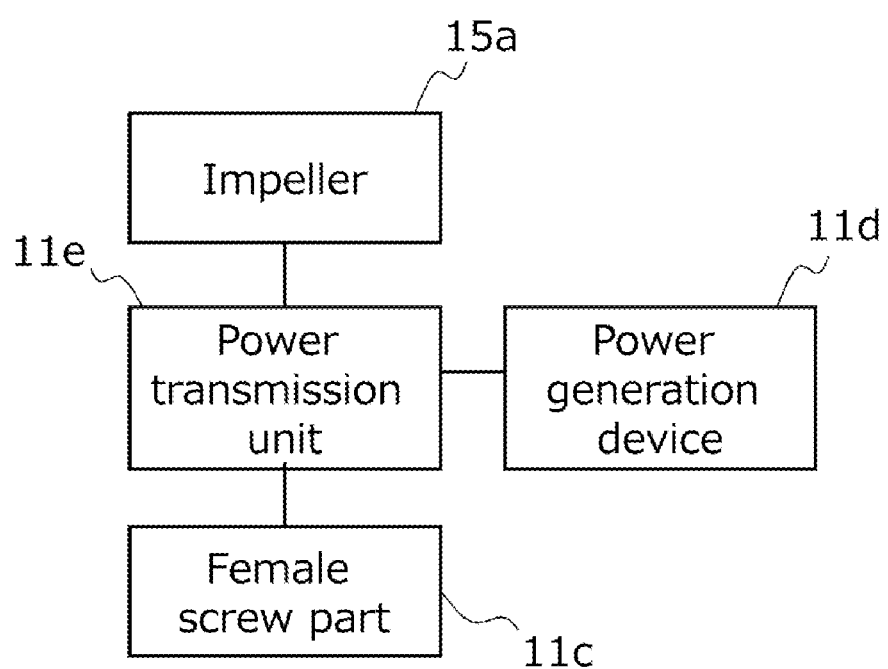
FIG. 8 is a view illustrating a configuration including an impeller, a power transmission unit, a female screw part, and a power generation device according to the second embodiment.

However, the wave power generator 11 is not limited to these modes, and may have another configuration (a second embodiment, see FIGS. 6 to 8).

The wave power generator 11 according to the second embodiment includes a float 11a, a male screw part (a first movement member) 11b, the female screw part (a second movement member) 11c, and the power generation device 11d. The male screw part 11b is provided on an outer wall of the tubular member (e.g., the first pipe 57a) to cover a side surface of said tubular member.

The male screw part 11b is fixed to an upper side of the float 11a to move in the vertical direction as the float 11a moves in the vertical direction.

The female screw part 11c is engaged with the male screw part 11b in a state where its movement in the vertical direction is restrained.

Accordingly, as the male screw part 11b moves in the vertical direction, the female screw part 11c rotates, rather than moving in the vertical direction.

The female screw part 11c and the power generation device 11d are disposed, for example, on the base part 20. A part of the male screw part 11b and the float 11a are disposed below the base part 20.

In accordance with the vertical movement of the male screw part 11b, the female screw part 11c rotates, and the power generation device 11d generates power based on a rotational force of the female screw part 11c.

In this case, the power generation device 11d can be disposed at a position where the waterproof treatment is easily performed, for example, on the base part 20.

Note that the female screw part 11c and the power generation device 11d may be included in a case including the float 11a to move in the vertical direction together with the float 11a. In this case, the male screw part 11b is fixed to the tubular member without being operated in conjunction with the vertical movement of the float 11a.

Cover 59 of Tank 53

As illustrated in FIG. 6, the tank 53 may be provided with a cover 59 that entirely covers the tank 53.

By providing the cover 59, the tank 53 can be prevented from being corroded by seawater or the like.

For example, the cover 59 is made of pressure-resistance reinforced transparent hard glass.

In this case, it becomes easy to visually recognize a damaged state of the tank 53 or the like from the outside of the cover 59.

In addition, it is preferable that there is a gap between an inner wall of the cover 59 and an outer wall of the tank 53.

A worker can enter the gap to perform maintenance work on the tank 53, or a mobile monitoring device can circulate along the gap between the tank 53 and the cover 59 to specify a damaged portion of the tank 53.

Sharing of Power Generation Device

As an example of the first embodiment, it has been described that the wave power generator 11 and the wind power generator 15 are separately configured.

However, the power generation device 11d generating power based on the rotational force of the female screw part 11c or the like of the wave power generator 11 may also generate power based on a rotational force of an impeller 15a of the wind power generator 15.

In this case, a power transmission unit 11e is provided between a member that performs a rotational motion of the wave power generator 11, such as the female screw part 11c, and a member that performs a rotational motion of the wind power generator 15, such as the impeller 15a.

The rotational force of the female screw part 11c and the rotational force of the impeller 15a are transmitted to the power generation device 11d via the power transmission unit 11e, and the power generation device 11d generates power based on these rotational forces.

In this way, the power generation device can be shared by the wave power generator 11 and the wind power generator 15.

Although some embodiments of the present invention have been described, these embodiments have been presented as examples, and are not intended to limit the scope of the invention. These embodiments can be implemented in various other forms, and various omissions, substitutions, and changes can be made without departing from the gist of the invention. The invention set forth in the claims and equivalents thereof are intended to cover those embodiments and modifications thereof as falling within the scope and gist of the invention.

REFERENCE SIGNS LIST

1 Power generation system
10 Power generation unit
11 Wave power generator
11a Float
11b Male screw part
11c Female screw part
11d Power generation device
11e Power transmission unit
13 Solar power generator
15 Wind power generator
15a Impeller
20 Base part
30 Control unit
40 Power storage unit
50 Hydrogen storage unit
51 Production unit (hydrogenation device or hydrogen production device)
53 Tank
53a First tank
53b Second tank
53c Third tank
55a First partition wall
55a1 First seal member
55b Second partition wall
55b1 Second seal member
55c Third partition wall
57a First pipe
57b Second pipe
57c Third pipe
57d Fourth pipe
57e Fifth pipe
57f Sixth pipe
58a First pump
58b Second pump
58c Third pump
58d Fourth pump
58e Fifth pump
58f Sixth pump
59 Cover
60 Propulsion device

The invention claimed is:

1. A power generation system comprising:
a power generation unit including a wave power generator;
a power storage unit accumulating electric power obtained by the power generation unit;
a production unit producing an organic hydride based on the electric power obtained by the power generation unit;

a tank located below compared to the wave power generator and storing the organic hydride obtained by the production unit; and a base part located above compared to a float of the wave power generator and holding the power storage unit, wherein the production unit is a hydrogenation unit producing the organic hydride from an aromatic compound, the tank includes a first tank storing the aromatic compound, a second tank storing the organic hydride, and a third tank storing water or air, the tank has a donut shape, at least a part of the wave power generator passes through a tubular member or a bar-shaped member connecting the base part and the tank, and is held in a swingable state in a vertical direction, the tubular member or the bar-shaped member extends from an outer wall on an inward side of the donut-shaped tank, the aromatic compound passes through the inside of at least one of the tubular members, the organic hydride passes through the inside of at least one of the tubular members other than the tubular member through which the aromatic compound passes inside, the water or air passes through the inside of at least one of the tubular members other than the tubular member through which the aromatic compound or the organic hydride passes inside, the tank includes a first partition wall to partition the first tank and the second tank, a second partition wall to partition the second tank and the third tank, and a third partition wall to partition the third tank and the first tank, and at least two of the first partition wall, the second partition wall, and the third partition wall are movable inside the tank.

2. A power generation system comprising:

a power generation unit including a wave power generator;

a power storage unit accumulating electric power obtained by the power generation unit;

a production unit producing an organic hydride based on the electric power obtained by the power generation unit;

a tank located below compared to the production unit and under water, and storing the organic hydride obtained by the production unit; and a base part located above compared to a float of the wave power generator and holding the power storage unit, wherein the production unit is a hydrogenation unit producing the organic hydride from an aromatic compound, the tank includes a first tank storing the aromatic compound, a second tank storing the organic hydride, and a third tank storing water or air, the tank has a donut shape, at least a part of the wave power generator passes through a tubular member or a bar-shaped member connecting the base part and the tank, and is held in a swingable state in a vertical direction, the tubular member or the bar-shaped member extends from an outer wall on an inward side of the donut-shaped tank, the aromatic compound passes through the inside of at least one of the tubular members, the organic hydride passes through the inside of at least one of the tubular members other than the tubular member through which the aromatic compound passes inside, the water or air passes through the inside of at least one of the tubular members other than the tubular member through which the aromatic compound or the organic hydride passes inside, the tank includes a first partition wall to partition the first tank and the second tank, a second partition wall to partition the second tank and the third tank, and a third partition wall to partition the third tank and the first tank, and at least two of the first partition wall, the second partition wall, and the third partition wall are movable inside the tank.

3. The power generation system according to claim 1, wherein the wave power generator includes a float, a first movement member moving in a vertical direction in conjunction with a vertical movement of the float, a second movement member engaged with the first movement member to rotate based on a vertical movement of the first movement member, and a power generation device generating power based on a rotational force of the second movement member.

4. The power generation system according to claim 3, wherein the power generation unit includes a wind power generator, and a rotational force of an impeller of the wind power generator and the rotational force of the second movement member are transmitted to the power generation device via a power transmission unit.

5. The power generation system according to claim 1, further comprising:

a cover covering the tank with a gap therebetween; and a mobile monitoring device provided between the cover and the tank, wherein the cover is made of a transparent member.

6. The power generation system according to claim 1, wherein the third tank is used to adjust a weight of the tank.

7. The power generation system according to claim 1, further comprising a propulsion device provided below compared to the wave power generator and driven based on the electric power from the power storage unit, wherein the power generation unit includes a wind power generator and a solar power generator, and the wind power generator and the solar power generator are provided on the base part.

8. The power generation system according to claim 1, wherein the hydrogenation unit produces the organic hydride from the aromatic compound using an organic hydride electrolytic synthesis method.

* * * * *